(No Model.) 4 Sheets—Sheet 1.

A. T. DOWDEN.
MACHINE FOR FORMING RODS FOR ENDLESS CONVEYERS.

No. 581,851. Patented May 4, 1897.

Witnesses:—
Geo. F. White
George Allan

Inventor: Ashford T. Dowden,
By Thomas G. and J. Ralph Orwig,
Attorneys.

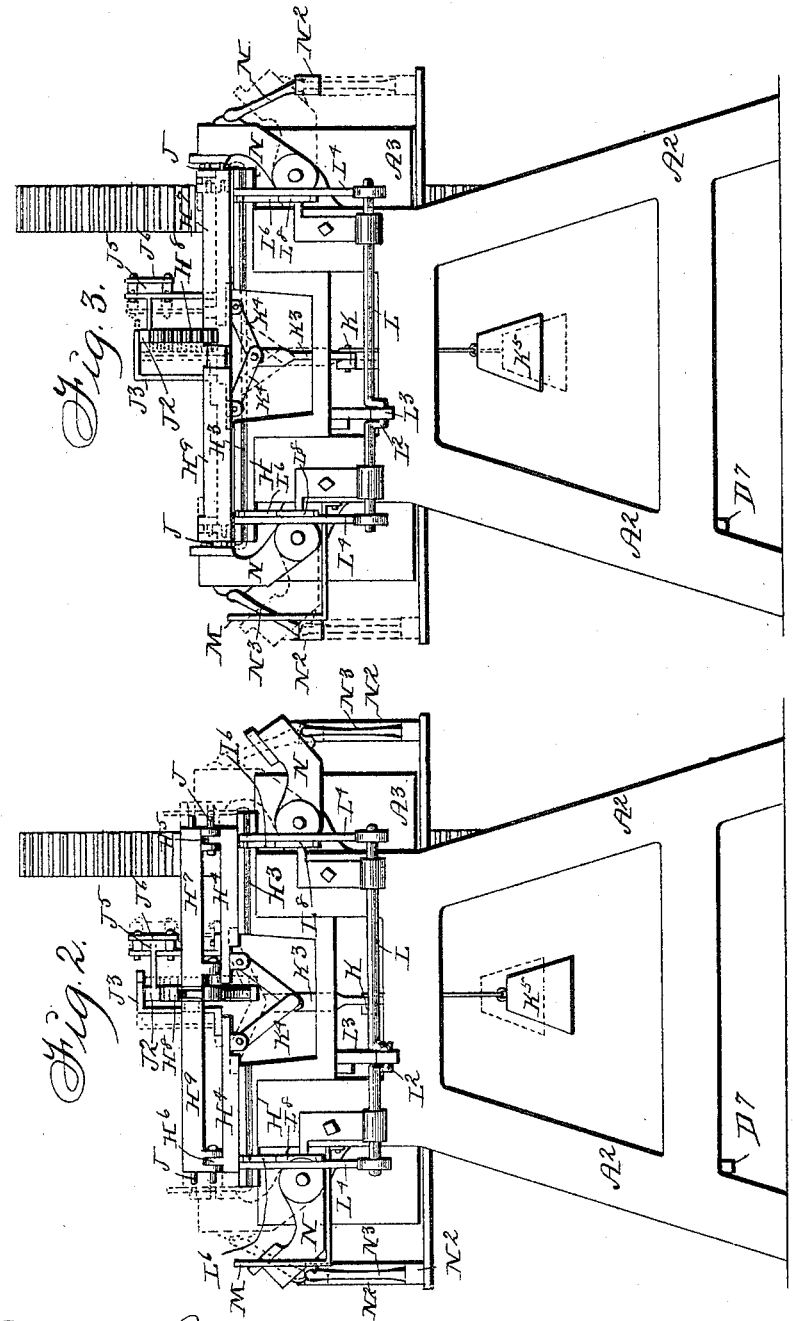

(No Model.) 4 Sheets—Sheet 3.

A. T. DOWDEN.
MACHINE FOR FORMING RODS FOR ENDLESS CONVEYERS.

No. 581,851. Patented May 4, 1897.

Witnesses:—
Geo. F. White
George Allan

Inventor: Ashford T. Dowden,
By Thomas G. and J. Ralph Orwig,
Attorneys.

(No Model.)   
A. T. DOWDEN.  
MACHINE FOR FORMING RODS FOR ENDLESS CONVEYERS.  
No. 581,851. Patented May 4, 1897.

4 Sheets—Sheet 4.

Witnesses:— Geo. F. White. George Allan.

Inventor: Ashford T. Dowden,
By Thomas & and J. Ralph Orwig,
Attorneys

UNITED STATES PATENT OFFICE.

ASHFORD T. DOWDEN, OF PRAIRIE CITY, IOWA.

MACHINE FOR FORMING RODS FOR ENDLESS CONVEYERS.

SPECIFICATION forming part of Letters Patent No. 581,851, dated May 4, 1897.

Application filed July 10, 1896. Serial No. 598,766. (No model.)

*To all whom it may concern:*

Be it known that I, ASHFORD T. DOWDEN, a citizen of the United States of America, residing at Prairie City, in the county of Jasper and State of Iowa, have invented a new and useful Machine for Forming Rods for Endless Conveyers, of which the following is a specification.

The object of this invention is to provide a machine of simple, strong, and durable construction into which iron rods of uniform length may be placed and the ends thereof automatically bent into such a shape that a series of them may be hooked together to form an endless conveyer in which regular and uniform spaces appear between the rods, so that potatoes or the like may be carried thereon and the earth and smaller potatoes permitted to pass through the conveyer.

My invention consists in certain details of construction, arrangement, and combination of the various parts of the machine, as hereinafter set forth, pointed out in my claims, and illustrated in the accompanying drawings, in which—

Figure 1:
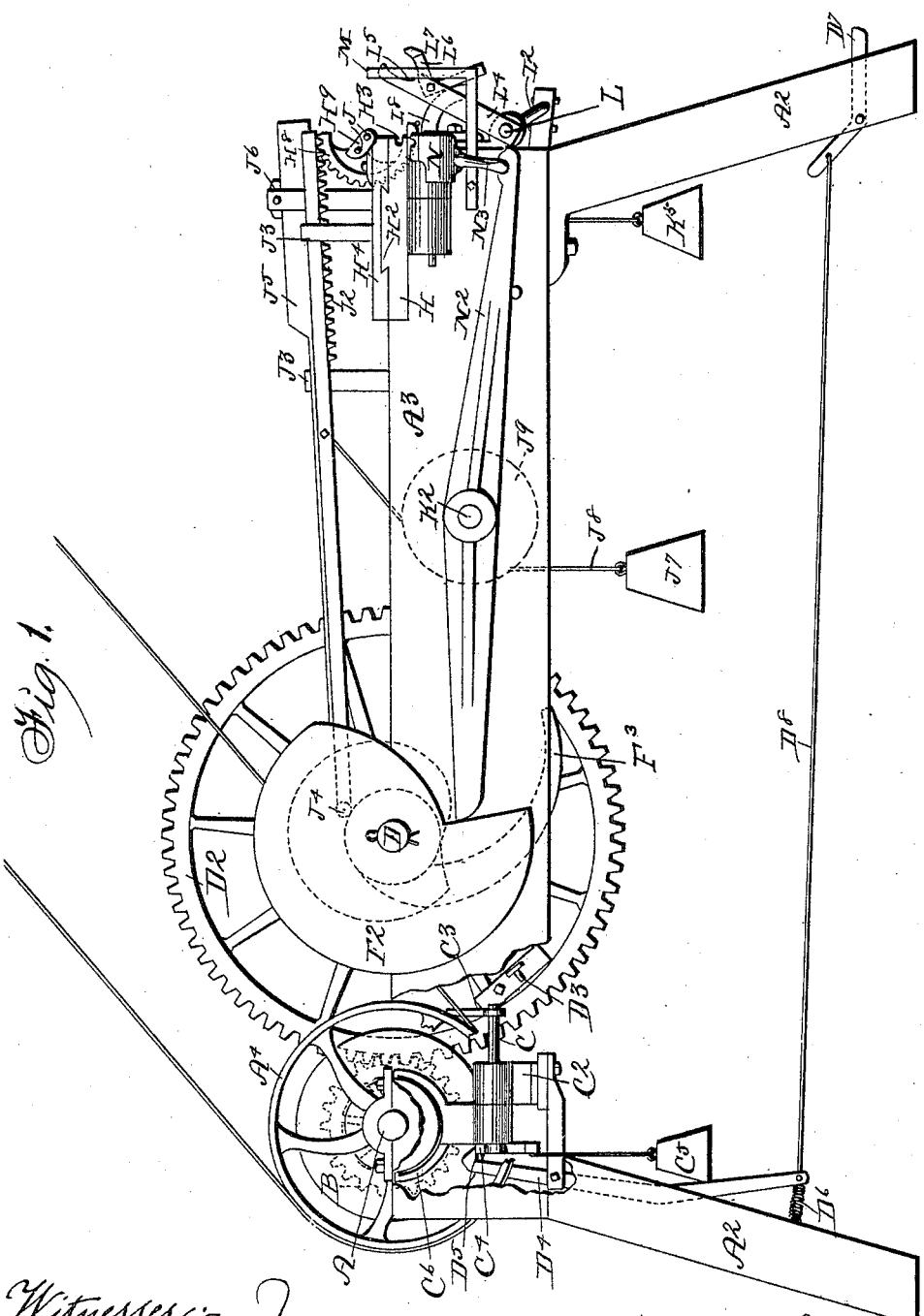
Figure 5:
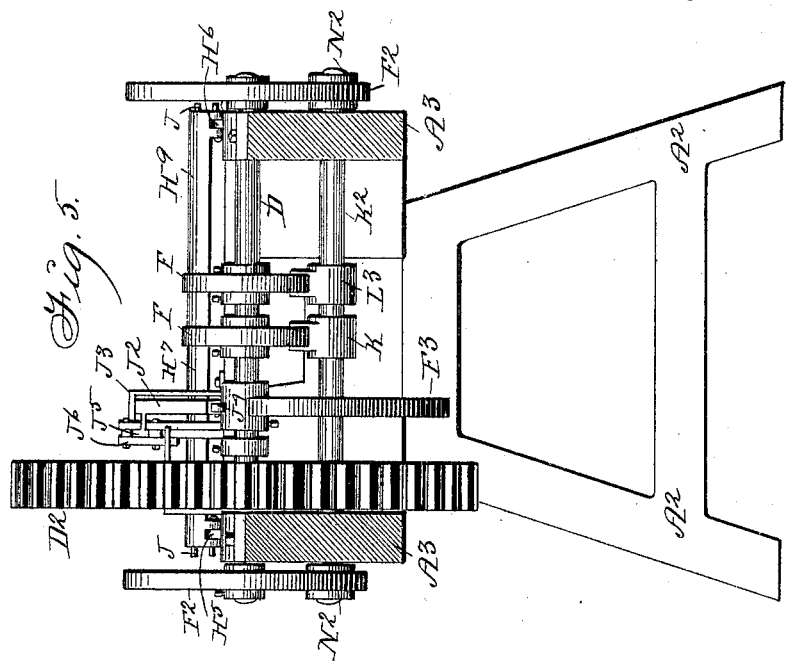
Figure 4:
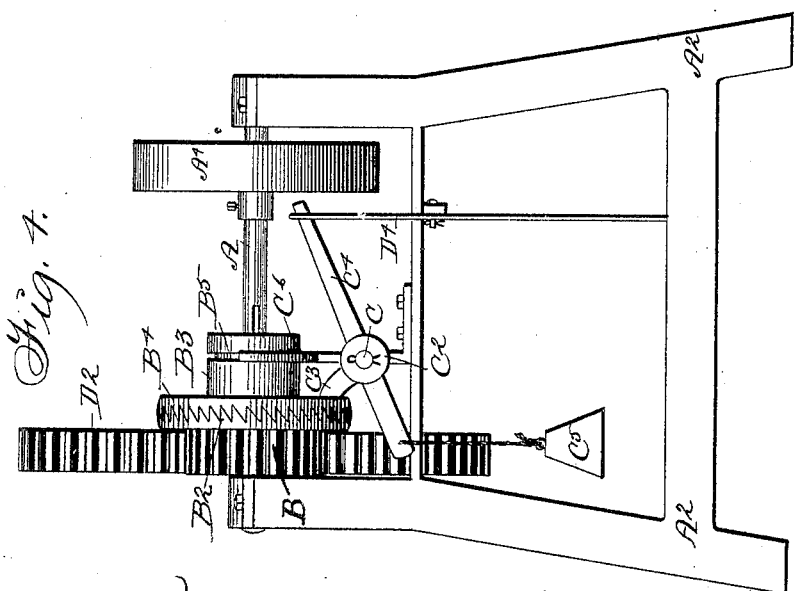
Figure 6:
Figure 7:
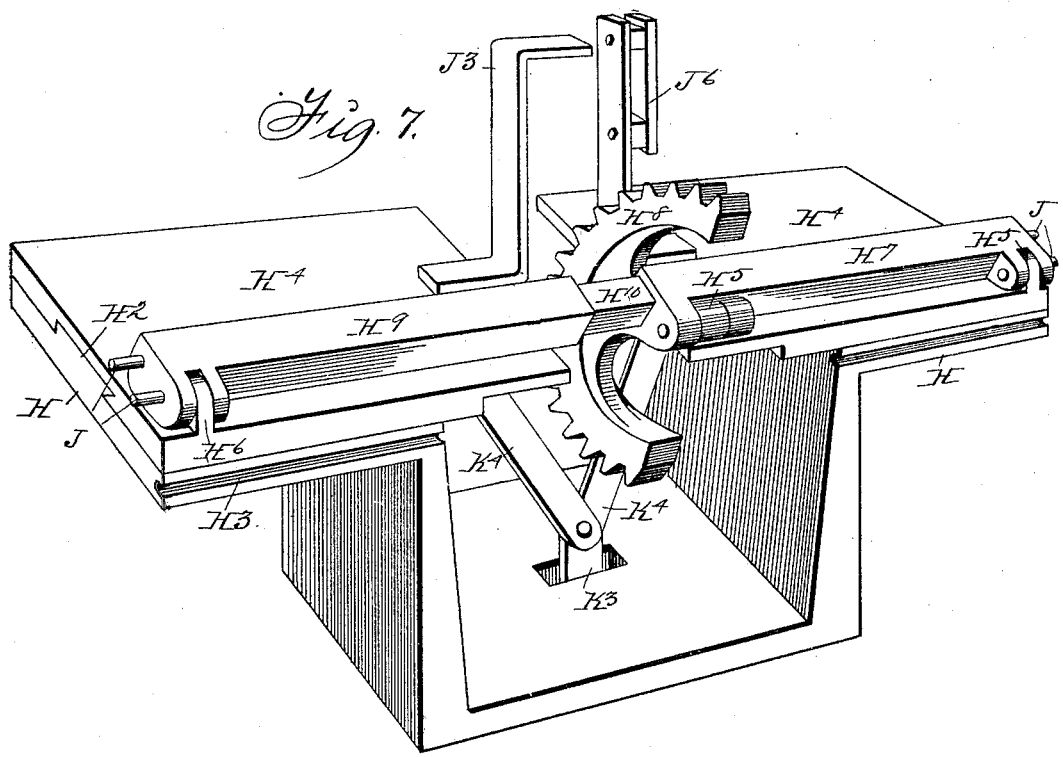

Figure 1 shows a side elevation of the complete machine, a part of the frame being broken away to show certain parts. Fig. 2 shows a front elevation of the complete machine, with dotted lines showing a different position of the working parts. Fig. 3 is a like view showing the parts in another position and by dotted lines in a still different position. Fig. 4 shows a rear end elevation of the complete machine. Fig. 5 shows a transverse section of the machine, looking forwardly from a point slightly in advance of the driving-shaft. Fig. 6 shows a perspective view of the product of the machine. Fig. 7 shows a detail perspective view of the fixed and sliding plates and attached parts.

In the accompanying specification I shall first describe the mechanism by which the machine is driven and the motion controlled and afterward the parts by which the rods are bent.

The reference-letter A is used to indicate the driving-shaft, rotatably mounted at the rear end of the machine-frame, of which $A^2$ are the legs and $A^3$ the side pieces. A belt-wheel $A^4$ is fixed to the shaft A, by means of which motion is transmitted to the machine. A gear-wheel B is loosely mounted on this shaft and provided with a hub having a ratchet-face $B^2$. A collar $B^3$ is feathered to the shaft and provided with a ratchet-face $B^4$ and an annular groove $B^5$. It is obvious that by sliding the collar on the shaft the clutch devices may be brought into engagement and the gear-wheel made to rotate in unison with the shaft. This clutch is automatically controlled to stop the machine after the completion of each rod by means of the following devices:

C indicates a shaft rotatably mounted in the bearer $C^2$, and extended longitudinally of the machine beneath the clutch on its forward end is an arm $C^3$, and on its rear a cross-arm $C^4$. On one end of the cross-arm a weight $C^5$ is fixed, and a Y-shaped device $C^6$ is fixed to the shaft with its ends admitted into the annular groove $B^5$. Hence as the shaft is rocked the sliding member of the clutch is moved longitudinally on its shaft to or from the fixed member.

A shaft D is rotatably mounted in the machine-frame in front of the shaft A, and on this shaft a gear-wheel $D^2$ is fixed to mesh with and be driven by the gear-wheel B. On this gear-wheel $D^2$, I have fixed a lug $D^3$, positioned so as to engage the arm $C^3$ at each revolution and thus elevate the arm and thereby throw the movable clutch out of engagement with the fixed one. The pressure of the weight would obviously tend to throw the clutch in gear at once. This is prevented by means of a lever $D^4$, pivoted to a stationary support and having a notch $D^5$ in its one end, that will engage one end of the cross-arm $C^4$ and hold it in its lowered position—that is, with the two clutches separated. This is aided by a contractile spring $D^6$ on the lower end of the lever. This lever is released, as required, to permit the weight to operate to throw the clutches in engagement, by means of a foot-lever $D^7$ at the forward end of the machine and a rod $D^8$, leading therefrom to the lever $D^4$. This arrangement obviously stops the operation of the machine after the completion of each rod until the foot-lever is depressed. Mounted upon this shaft D are a number of cams, each of which has one cam-surface only. Certain levers and bars are held in engagement with these cams and are operated but once for each revolution of the shaft D. On the exterior of the machine-frame the cams $F^2$ are fixed to the shaft D. Near the central portion the two cams F are fixed, and at one side of its center a cam $F^3$ is secured, as clearly shown in Fig. 5.

H indicates a metal plate having a dovetailed rib $H^2$ at its top and bent downwardly at its central portion and fixed to the front end of the machine-frame. A horizontal groove $H^3$ is formed in its front edge to receive the rod as its ends are being bent. On top of each end of this plate H is a flat plate $H^4$, provided with a dovetailed groove to admit the rib $H^2$. On the forward edge of one of the plates $H^4$ two perforated lugs $H^5$ are formed, and on the other plate in alinement therewith a lug $H^6$ is formed. An angular bar $H^7$ is pivoted to the lugs $H^5$ to be capable of swinging outwardly over the front edge of the plate. It is provided with a segmental gear-wheel $H^8$ at its inner end, and said end has an angular opening therein. A like bar $H^9$ is pivoted to the other plate and provided with an angular projection $H^{10}$ to enter said opening. On the outer end of each bar are two pins J to project straight outwardly. They are so arranged that when a rod resting in the groove in the under plate is bent straight upwardly at its ends said ends will enter between the pins, and when the bars $H^7$ and $H^9$ are turned forwardly over the edge of the plate said rod will have its ends bent forwardly. This forward motion of the said bars $H^7$ and $H^9$ is accomplished at each revolution of the large gear-wheel by means of a rack $J^2$, slidingly mounted in suitable guides $J^3$ and having a roller $J^4$ on its rear end to be engaged by the cam $F^3$ and having its forward end in mesh with the segmental gear-wheel $H^8$. A guide-rod $J^5$ is attached thereto and extended parallel therewith. It rests in the guides $J^6$ and holds the rack securely in place. The rack is automatically returned by means of a weight $J^7$, attached to a rope $J^8$ and passed over a grooved pulley $J^9$, which is loosely mounted in a suitable position in the rear of the point of attachment of the rope to the rack-bar.

The flat plates $H^4$ are arranged to slide to and from each other, so that after the rod has been bent into proper form the plates may be moved together and the rod be readily disengaged from the pins by which it was bent. This movement of the plates is accomplished by means of a lever K, fulcrumed on a shaft $K^2$ and having an end in engagement with one of the cams F and its other end pivoted to a link $K^3$, which in turn is pivoted to two arms $K^4$, the opposite ends of which are pivoted to the plates. So long as the lever is engaged by the concentric surface of the cam F the said link is held up and the plates extended, but when the lever engages the depressed cam surface the lever is freed and its front end drawn downwardly by means of the weight $K^5$, which is attached thereto.

I have provided a device for gripping the rods and for carrying them to, and holding them in, the groove in the under plate while their ends are being bent, as follows:

L indicates a rock-shaft mounted in suitable bearings on the front of the machine-frame, having a crank-arm $L^2$ formed thereon to project downwardly. $L^3$ indicates a lever pivoted to said crank-arm fulcrumed to the shaft $K^2$ and having its rear end in engagement with one of the cams F. Obviously as the cams rotate the shaft L will be rocked by means of said lever.

$L^4$ indicates an arm fixed to the end of the shaft to project upwardly and forwardly therefrom. Its upper outer corner is recessed at $L^5$.

$L^6$ indicates an L-shaped grip device pivoted to the arm $L^4$ and having its upper inner corner recessed at $L^7$ to correspond with the recess at $L^5$. When said arm and grip device are brought together, it is readily seen that a rod will be tightly held therein. This is effected by means of a segmental guide $L^8$, rigidly fixed to the machine-frame and held in position so that the under surface of the L-shaped grip device $L^6$ will engage therewith as it is moved upwardly and rearwardly, and thus cause the upper end of the L-shaped device to move toward the arm to which it is pivoted. A like grip device is on each end of the shaft.

M indicates a guide fixed to the machine-frame and so positioned that when a rod is placed in the grippers one end is moved to engage the guide to be held thereby in proper position.

The end of the rods are bent upwardly, so as to enter between the pins J by means of the following mechanism:

N indicates an arm pivoted to the side of the machine-frame and designed to swing upwardly into a position to engage the pins J and also in position to engage the end of a rod that is resting in the groove of the under plate.

$N^2$ indicates a lever fulcrumed to the shaft $K^2$ with its rear end in engagement with one of the cams $F^2$, and at its front end is a rod $N^3$, having a universally-pivoted attachment with the lever and with said arm N.

It is obvious that upon a rotation of the cam the forward end of the lever will be elevated and the arm raised, as required, to bend the end of the rod upwardly. A similar device is of course placed at each side of the machine.

In practical use, assuming that the machine is at rest in the position shown in solid lines in Fig. 2, a rod having its ends heated is placed in the grippers with one end in engagement with the guide. When the machine is started by a pressure upon the foot-treadle, the two central levers will first be raised at their forward ends, resulting in carrying the rod to its groove and spreading the sliding plates and the bar that carries the pins J, as shown in dotted lines in the said figure. Then the arms N are moved upwardly to give the upward bend to the ends of the rod and to place them between the pins J. The next movement will be a forward half-turn of the bars H⁷ and H⁹, which will obviously bend the rods forwardly and downwardly. The final movement is withdrawal of the pins J from engagement with the rod by a moving together of the sliding plates and the bars H⁷ and H⁹ and throwing the arms N outwardly, as shown in dotted lines in Fig. 3, thus releasing the rod and permitting it to drop.

Having thus described my invention, what I claim as new therein, and desire to secure by Letters Patent of the United States therefor, is—

1. The combination in a rod-bending machine, of means for controlling the motion of the machine comprising a rotatable shaft, means for driving same, a small gear-wheel loosely mounted thereon having a ratchet-clutch on its hub, a ratchet-clutch feathered to the shaft and having an annularly-grooved hub, a rock-shaft extended longitudinally of the frame, a cross-arm pivoted thereto, a weight on one end of the cross-arm, a Y-shaped device fixed to the shaft with its ends in said annular groove, an arm on the forward end of the rock-shaft, a lever pivoted to the machine-frame in a vertical position, a hook formed in one end thereof to engage the said cross-arm, a spring for holding the lever in engagement with the cross-arm, a treadle connected with said lever to operate against the spring, a large gear-wheel in mesh with the aforesaid small gear-wheel, and a lug fixed thereto to engage the arm on the forward end of said rock-shaft at each revolution of the wheel, substantially as and for the purposes stated.

2. In a rod-bending machine, the combination of a rotatable cam, a lever to be engaged thereby, a crank-shaft having said lever attached thereto, two arms on said crank-shaft, an L-shaped grip device pivoted to each arm, and a segmental guide to be engaged by said L-shaped grip device, substantially as and for the purposes stated.

3. In a rod-bending machine, the combination of a suitable grip device for holding the rods stationary, two cams rotatably mounted, two levers each having one end in engagement with the cams, two arms pivoted to the machine-frame to move toward the ends of the rods, and universally-pivoted connections between the arms and levers, for the purposes stated.

4. In a rod-bending machine, the combination of means for gripping a rod, means for bending its ends upwardly, two bars pivoted to the machine-frame, means for rocking the bars forwardly, two pins on the outer end of each bar to admit the end of the rod between them, and means for moving said bars toward each other, after rocking forwardly, to disengage the rod, for the purposes stated.

5. In a rod-bending machine, the combination of means for gripping a rod, means for bending its ends upwardly, two bars pivoted to the machine-frame and telescopically connected at their central portions, two pins on the outer end of each, a segmental pinion on one bar, a rack slidingly mounted on the machine-frame to mesh with said pinion, means for automatically returning the rack, a cam rotatably mounted to engage said rack and force it forwardly, and means for forcing said bars inwardly, after the rod is bent, to disengage the rod, for the purposes stated.

6. In a rod-bending machine, the combination of a stationary plate grooved at its forward edge to admit a rod, two plates mounted on its top and capable of a longitudinal movement thereon, a bar pivoted to each plate and capable of turning forwardly over the end of the plate, an angular inner end on one bar to enter a like opening in the other bar, a segmental gear-wheel on one bar, two pins on the outer end of each bar, a rack slidingly supported to mesh with said segmental gear, a cam rotatably mounted to engage the rear end of the rack, a device for automatically returning the rack, and means for moving the plates to and from each other, for the purposes stated.

7. In a rod-bending machine, the combination of a stationary plate grooved at its forward edge to admit a rod, two plates mounted on its top and capable of a longitudinal movement thereon, a bar pivoted to each plate and capable of turning forwardly over the end of the plate, an angular inner end on one bar to enter a like opening in the other bar, a segmental gear-wheel on one bar, two pins on the outer end of each bar, a rack slidingly supported to mesh with said segmental gear, a cam rotatably mounted to engage the rear end of the rack, a device for automatically returning the rack, a cam on the same shaft as the aforesaid cam, a lever fulcrumed to a part of the machine with one end in engagement with said cam, a link pivoted to its forward end, two arms pivoted to said link and to the said sliding plates, and a weight attached to the forward end of the lever, substantially as and for the purposes stated.

8. A machine for forming rods for endless conveyers, comprising a frame, grip devices for automatically grasping straight rods, pivoted arms capable of swinging upwardly and bending the ends of the rods upwardly, means for automatically operating said arms at certain predetermined periods, a bar hinged to the machine-frame designed to receive the upturned ends of the rod, means for automatically turning said bar forwardly to bend the rod, means for automatically contracting the length of said bar to release the rod, and means for automatically releasing the grip devices, all arranged and combined substantially as and for the purposes stated.

ASHFORD T. DOWDEN.

Witnesses:
WM. KINGDON,
H. C. GILL.